Oct. 28, 1930.  E. WALDER  1,779,455
AUTOMATICALLY CONTROLLED ELECTRICAL PLUG
Filed Jan. 13, 1925
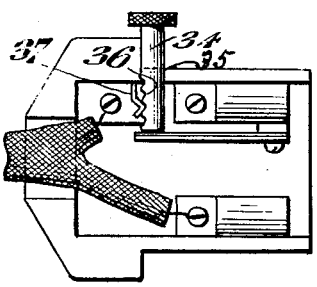
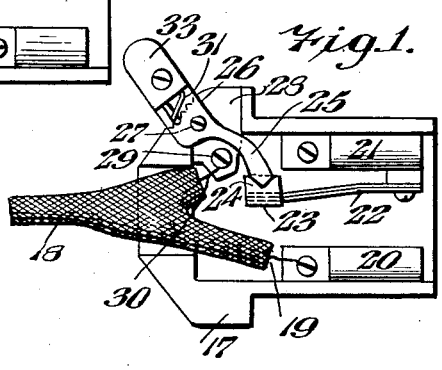
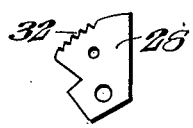
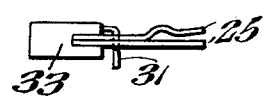
Inventor
Emil Walder
By J. Bonsall Taylor
Herbert S. Fairbanks
Attorneys Patented Oct. 28, 1930

1,779,455

UNITED STATES PATENT OFFICE

EMIL WALDER, OF PHILADELPHIA, PENNSYLVANIA, ASSIGNOR TO THE BEARDSLEY & WOLCOTT MANUFACTURING COMPANY, A CORPORATION OF CONNECTICUT

AUTOMATICALLY-CONTROLLED ELECTRICAL PLUG

Application filed January 13, 1925. Serial No. 2,160.

My present invention comprehends a novel construction and arrangement of an automatically controlled electrical plug, wherein, when the article to which it is applied, such as, for example, an electric iron, becomes heated beyond a predetermined degree, the current will be automatically cut off, and, when the temperature falls below the predetermined degree, an electrical connection will be made to effect the heating of the article to which the plug is connected.

It further comprehends a novel construction and arrangement of a plug having a thermostat connected with the pilot terminal thereof, and novel means for adjusting the thermostat to determine the degree of heat at which it is operative to open or close the electric circuit.

It further comprehends a novel construction of a plug wherein the opening and closing of the circuit is automatic, and wherein a manually controlled member extending exteriorly of the plug can be employed to adjust the thermostat so that it will operate at a predetermined temperature.

Other novel features of construction and advantage will hereinafter more clearly appear in the detailed description and the appended claims.

For the purpose of illustrating the invention, I have shown in the accompanying drawing typical embodiments of it, which, in practice, will give reliable and satisfactory results. It is, however, to be understood that these embodiments are typical only, and that the various instrumentalities of which my invention consists can be variously arranged and organized, and that the invention is not limited to the precise arrangement and organization of these instrumentalities as herein set forth.

Figure 1 is a sectional plan view of one embodiment of my invention.

Figures 2, 3 and 4 respectively, represent plan views of portions of the electrical connections seen in Figure 1.

Figure 5 is a plan view with one of the body portion sections removed showing another embodiment of my invention.

Similar numerals of reference indicate corresponding parts.

Referring to the drawings:

In the embodiment seen in Figure 1, it will be clear from the drawings that in accordance with this embodiment I use a bi-metallic thermostatic strip, one end of which is free and the other end of which is closely associated with the pilot terminal, the latter end, as illustrated, being directly connected therewith while the opposite end operates to reversely actuate the movable contact to automatically open and close the circuit. The body portion of the plug is made of insulating material to form the body sections 17 which are adapted to receive the electrical conductor-cable 18. One terminal wire 19 of such cable is electrically connected with the terminal of a socket 20 in the usual manner. The other socket 21 has fixed to it one end of a thermostat 22, in the form of a bi-metallic strip of thermostatic material having fixed to its outer end a conductor plate 23, having a laterally deflected portion 24 which is adapted to pass between the arms 25 of a lever 26, which latter is pivoted at 27 to a plate 28 of conducting material, which is fixed to a body portion section 17.

This plate has secured to it by means of a screw 29 the terminal wire 30 of the conductor cable 18. The lever is retained in its fixed position by means of a spring 31 which is adapted to engage the notches 32 in the outer edge or peripheral portion of the conducting plate 28. This spring has one portion fixed to the lever 26 and is provided with another portion guided in a slot in the lever 26. The lever 26 is provided with the grasping portion 33 of insulating material. In this embodiment of my invention, it will be understood that the arms 25, at the outer end of the lever 26, can be positioned so that the thermostat 22 will co-operate with it to open or close the circuit at a predetermined degree of temperature It will be apparent that the user can, at any time desired, actuate the manual adjustment for the automatic control to render the plug inoperative by moving the conductor portion with which the thermostat co-operates out of the path of the thermostat.

It will be apparent that the thermostat can be adjusted, so that, when a desired degree of temperature is reached, the circuit will be automatically opened, and, when the temperature falls below the predetermined degree of temperature, the circuit will be automatically closed.

An automatically controlled electrical plug constructed in accordance with my invention can be very economically manufactured and has been found in practice to give satisfactory and reliable results.

If desired the contact portion carried by the thermostat and the adjustable contact member with which it co-operates can be provided with platinum or other contact points such as are common and well known in the art of circuit makers and breakers, and it is to be understood that this is within the scope of this invention to provide such members with separate contacts which tends to prevent arcing, when the electric circuit is opened or closed.

Special attention is directed to the fact that the thermostat is connected with one socket member, for example, the terminal socket 21, which by means of the thermostat 22 is electrically connected with the conducting plate 28 which carries the binding post 27.

By utilizing the pilot terminal for the thermostat control, the thermostat will be heated more quickly than if it were connected with the other terminal socket of the plug.

This enables one to control the current before it reaches the appliance to which the plug is attached.

It will be apparent that instead of having the adjusting member swinging, it can be longitudinally slidable, as shown in Fig. 5, in which case the manually adjustable rod 34 is slidable in an opening 35 carried by a conducting plate, and the rod is provided with serrations or notches 36 which are adapted to engage the free end of a spring member 37 to retain the longitudinally slidable contact member 34 in its adjusted positions.

It will now be apparent that I have devised a new and useful automatically controlled electrical plug which embodies the features of advantage enumerated as desirable in the statement of the invention and the above description, and while I have, in the present instance, shown and described a preferred embodiment thereof which will give in practice satisfactory and reliable results, and also one modification thereof, it is to be understood that these embodiments are susceptible of modification in various particulars without departing from the spirit or scope of the invention or sacrificing any of its advantages.

Having thus described my invention, what I claim as new and desire to secure by Letters Patent, is:

1. A thermostatic switch for an electrical plug, having in its electrical circuit an insulated terminal adapted to be directly connected with a heating element, a thermostatic strip having one end free and its other end closely associated with said terminal, and contact means operable upon reverse movements of the free end of said strip to automatically open and close the circuit.

2. A thermostatic switch for an electrical plug, having in its electrical circuit an insulated terminal adapted to be directly connected with a heating element, a thermostatic strip having one end free and its other end closely associated with said terminal, and contact means including an adjustable contact and operable upon reverse movements of the free end of said strip to automatically open and close the circuit.

3. A thermostatic switch for an electrical plug, having in its electrical circuit an insulated pilot terminal adapted to be directly connected with a heating element, a bimetallic thermostatic strip having one end free and its other end closely associated with said pilot terminal, and a contact co-operating with the free end of said strip to automatically open and close the circuit.

4. A thermostatic switch for an electrical plug, having in its electrical circuit an insulated pilot terminal adapted to be directly connected with a heating element, a bimetallic thermostatic strip having one end free and its other end closely associated with said pilot terminal, and an adjustable contact cooperating with the free end of said strip to automatically open and close the circuit.

5. A thermostatic switch for an electrical plug comprising an insulated support, a thermostat having one end secured to said support, a binding post on said support adapted to be connected to a conductor, a conducting member pivoted to said binding post and having its forward end adapted to co-operate with said thermostat to open and close the circuit, and means to lock said pivoted member in the position to which it has been adjusted.

6. A thermostatic switch for an electrical plug comprising an insulated support, a thermostat having one end secured to said support, a binding post on said support adapted to be connected to a conductor, a conducting member pivoted to said binding post and having its forward end adapted to co-operate with said thermostat to open and close the circuit, and resilient means to retain said pivoted member in the position to which it has been adjusted.

7. A thermostatic switch for an electrical plug comprising a thermostat in the form of a strip having one end supported and its other end free, a contact carried by said free end, an adjustable contact movably mounted, having a bifurcated end to co-operate with the contact on said thermostat strip, and resilient means to secure said adjustable contact in its adjusted position.

EMIL WALDER.